United States Patent [19]

Katayama et al.

[11] Patent Number: 5,288,770
[45] Date of Patent: Feb. 22, 1994

[54] RESIN COMPOSITION FOR CATIONICALLY ELECTRODEPOSITABLE PAINT COMPRISING ALICYCLIC EPOXY RESINS AND EMULSION POLYMERIZED, FINELY DIVIDED GELLED POLYMERS

[75] Inventors: Teiji Katayama; Eisaku Nakatani; Haruo Nagaoka; Kenji Yamamoto, all of Hiratsuka; Reiziro Nishida, Chigasaki, all of Japan

[73] Assignee: Kansai Paint Co., Ltd., Hyogo, Japan

[21] Appl. No.: 643,931

[22] Filed: Jan. 22, 1991

[30] Foreign Application Priority Data

Jan. 20, 1990 [JP] Japan .................. 2-9493

[51] Int. Cl.$^5$ .................. C09D 163/00; C09D 151/00; C09D 5/44; C08F 291/00
[52] U.S. Cl. .................. 523/201; 523/402; 523/404; 523/409; 523/414; 523/415; 523/417; 523/418; 523/421; 525/113; 525/116; 525/117; 525/118; 525/423; 525/454; 525/482; 525/483; 525/484; 525/504; 525/526
[58] Field of Search .............. 523/404, 201, 414, 417, 523/421, 415, 402, 409; 428/418; 525/118, 526, 423, 454, 504, 482, 483, 484, 113, 117, 116

[56] References Cited

U.S. PATENT DOCUMENTS

| | | | |
|---|---|---|---|
| 4,987,178 | 1/1991 | Shibata et al. | 526/279 |
| 5,021,530 | 6/1991 | Yamamoto et al. | 526/220 |
| 5,089,542 | 2/1992 | Nishida et al. | 523/414 |
| 5,096,984 | 3/1992 | Nishida et al. | 525/426 |
| 5,139,631 | 8/1992 | Mishida et al. | 523/404 |

FOREIGN PATENT DOCUMENTS 0356970  3/1990  European Pat. Off. .
3926326  2/1990  Fed. Rep. of Germany .

*Primary Examiner*—Frederick Krass
*Attorney, Agent, or Firm*—Wenderoth, Lind & Ponack

[57] ABSTRACT

A resin composition for a cationically electrodepositable paint comprising
(A) a resin having hydroxyl groups and cationic groups,
(B) an epoxy resin having at least 2 epoxy functional groups each of which comprises an epoxy group directly bound to an alicyclic ring and/or bridged alicyclic ring on average per molecule, and
(C) a finely divided gelled polymer as principal components, wherein said finely divided gelled polymer is obtained by emulsion polymerizing
(C-1) a polymerizable monomer containing at least two radically polymerizable unsaturated groups in the molecule, and
(C-2) a radically polymerizable unsaturated monomer other than the one mentioned in (C-1), above in the presence of a reactive emulsifier containing an allyl group in the molecule.

21 Claims, No Drawings

RESIN COMPOSITION FOR CATIONICALLY ELECTRODEPOSITABLE PAINT COMPRISING ALICYCLIC EPOXY RESINS AND EMULSION POLYMERIZED, FINELY DIVIDED GELLED POLYMERS

The present invention relates to a novel resin composition for a cationically electrodepositable paint which is excellent in bath stability and curability without using a block polyisocyanate as a curing agent and an organotin compound as a curing catalyst, in addition having excellent film performances such as good adhesion, good weather resistance, good corrosion resistance and good low temperature curability as well as an improved edge covering property of the edge portion of the coated film.

As a conventional resin composition for a cationically electrodepositable paint, a resin composition comprising an aromatic polyisocyanate compound blocked by alcohols (curing agent) and a polyamine resin such as an amine-added epoxy resin as a primary component is most widely used, which earned an excellent assessment with reference to corrosion resistance of the paint film, however, this resin composition has essentially defects, the following points, first of all, curing initiating temperature is high (at least 170° C.), and to lower this curing initiating temperature, when an organotin compound is used as a curing catalyst, said tin compound sometimes poisons an exhaust combustion catalyst of the baking furnace; further, to cure the paint film, when the film is heated at a high temperature, the blocked polyisocyanate thermally decomposes to produce gum and soot, in addition, brings about yellowing, bleeding and curing impediment of the top coat film, at the same time, said top coat film remarkably lowers in weather resistance and tends to be whitened, that are serious drawbacks, therefore, the improvement thereof is strongly desired.

With a view to providing a resin composition for a cationically electrodepositable paint having an excellent merit of such an isocyanate curing type without using a blocked isocyanate compound and an organotin compound that has solved the aforesaid drawbacks brought about by the use of these compounds, the present inventors have previously proposed a resin composition for a cationically electrodepositable paint comprising (A) a resin having hydroxyl groups and cationic groups; and (B) an epoxy resin having at least 2 epoxy functional groups each of which comprises an epoxy group directly bound to an alicyclic ring and/or bridged alicyclic ring on average per molecule as principal components (British Patent Laid-Open No. 356970).

The resin composition for a cationically electrodepositable paint has various excellent advantages such as it can be cured at a low temperature of not more than 160° C. in the absence of a tin catalyst; further it is free from a blocked isocyanate compound or a derivative thereof and can dissolve the aforesaid various drawbacks produced by their use; it is free from the volumetric shrinkage due to thermal decomposition and exhibits good adhesion; it is free from an aromatic urethane linkage or aromatic urea linkage and does not hurt the weather resistance; it is excellent in corrosion resistance, curability and bath stability.

However, further investigations by the present inventors revealed that the above-described resin composition for a cationically electrodeposited paint has an insufficient edge cover property.

Accordingly, the present inventors have made assiduous investigations in order to improve the edge cover property without impairing the advantages of the above resin composition, and as a result found that the above-described objects can be achieved by blending the resin composition with specified finely divided gelled polymer, and thus complete the present invention.

Thus, according to the present invention, there is provided a resin composition for a cationically electrodepositable paint comprising (A) a resin having hydroxyl groups and cationic groups, (B) an epoxy resin having at least 2 epoxy functional groups each of which comprises an epoxy group directly bound to an alicyclic ring and/or bridged alicyclic ring an average permolecule, (C) a finely divided gelled polymer as principal components, wherein Said finely divided gelled polymer is obtained by emulsion polymerizing (C-1) a polymerizable monomer containing at least two radically polymerizable unsaturated groups in the molecule, and (C-2) a radically polymerizable unsaturated monomer other than the one mentioned in (C-1), above in the presence of a reactive emulsifier containing an allyl group in the molecule.

The resin composition for a cationically electrodepositable paint of the present invention (hereafter, sometimes abbreviated as "the resin composition of the invention") has an improved edge cover property without impairing the afore-said advantages which compositions comprising the components (A) and (B) above as principal components have.

An electrodeposited paint film formed with a paint using the resin composition of the invention can be cured at a temperature of less than about 250° C. Especially, when compounds containing metals such as lead, zirconium, cobalt, aluminum, manganese, copper, zinc, iron, chromium and nickel are blended singly or in combination as a catalyst, the electrodeposited paint film can be cured with heating at such a low temperature as from about 70° C. to about 160° C. It is inferred that these curings are attributable to ring-opening of an epoxy group contained in the epoxy resin (B) and reaction with a (preferably primary) hydroxyl group in the resin (A), and to reaction of one epoxy group with another in the epoxy resin (B) to form ether bonds, respectively that crosslink and cure the resin composition.

Finely divided gelled polymers are sometimes added to a paint composition, in order to improve the spraying effect of the paint, prevent sagging of the coated film and perform the pattern control of a metallic pigment. However, many of such finely divided gelled polymers are of non-aqueous dispersion, or even if they are dispersed in aqueous medium, they are dispersions obtained by emulsion polymerization in the presence of a non-reactive surface active agent, and adversely affect various properties of the coated film such as water resistance, solvent resistance and chemical resistance.

The component (C) used in the resin composition of the invention is a finely divided gelled polymer crosslinked internally incorporated with a group having a surface activity by chemical bond in the surface of the resin and markedly contributes to the improvements of edge covering property and corrosion resistance of the edge portion without adversely affecting the performances of the coated film such as water resistance, solvent resistance and chemical resistance.

The components (A), (B) and (C), which are the principal components of the resin composition of the invention, will be explained in more detail hereinbelow.

Component (A): Resin having hydroxyl groups and cationic groups

This resin includes any resin having hydroxyl groups reactive with the epoxy group of the component (B) explained later on and a sufficient number of cationic groups for forming a stable aqueous dispersion. As the component (A), for example, what follows may be cited.

(i) A reaction product obtained by reacting a polyepoxy resin with a cationizing agent;

(ii) A polycondensation product of a polycarboxylic acid and polyamine (see U.S. Pat. No. 2,450,940) protonated with an acid;

(iii) A polyaddition product of polyisocyanate and polyol and mono- or poly-amine protonated with an acid;

(iv) A copolymer of an acrylic or vinyl monomer containing a hydroxyl group and one containing amino group protonated with an acid (see Japanese Patent Publications Nos. 12395/1970 and 12396/1970);

(v) An adduct of a polycarboxylic acid resin and an alkylene imine protonated with an acid (see U.S. Pat. No. 3,403,088); etc.

Since the specific examples of these cationic resins and the processes for their production are described in, for example, Japanese Patent Publications Nos. 12395/1970 and 12396/1970, and GB 1327071 as well as U.S. Pat. Nos. 2,450,940, 3,403,088, 3,891,529 and 3,963,663, detailed description of the specific examples of these cationic resins and the processes for their production is replaced by quotation of these references in this specification.

What is especially desirable as the component (A) (A) in the present invention is a reaction product obtained by reacting a polyepoxide compound obtained from a polyphenol compound and epichlorohydrin with a cationizing agent included in (i), above.

Said polyepoxide compound is a compound having at least 2 epoxy groups

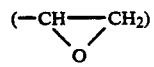

one molecule, and having a number average molecular weight within the range of generally at least 200, preferably 400 to 4,000, more preferably 800 to 2,000 is suitable. As such polyepoxide compound, what is known per se may be used, for example, polyglycidyl ether of a polyphenol compound which may be produced by reacting a polyphenol compound with epichlorohydrin in the presence of an alkali, is included.

As the polyphenol compound which may be used in the above reaction, there may be cited, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenylether, 4,4'-dihydroxydiphenylsulfone, phenol novolak and cresol novolak.

Of the aforesaid polyepoxide compounds, what is especially preferable for the production of the component (A), is diglycidylether of a polyphenol compound having a number average molecular weight of at leat about 380, more preferably about 800 to about 2,000 and an epoxy equivalent of 190 to 2,000, preferably 400 to 1,000, especially what is represented by the following formula:

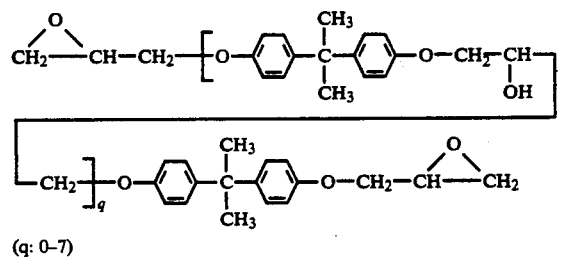

(q: 0-7)

Said polyepoxide compound may be partly reacted with polyol, polyether polyol, polyester polyol, polyamide amine, a polycarboxylic acid and polyisocyanate, and further, it may be graft polymerized with ε-caprolactone or an acrylic monomer, etc.

On the other hand, as a cationizing agent for introducing a cationic group to said polyepoxide compound, there may be cited an aliphatic, alicyclic or aromatic-aliphatic primary or secondary amine, tertiary amine salt, secondary sulfide salt and tertiary phosphine salt. These react with an epoxy group to produce a cationic group. It is further possible to introduce a cationic group by reacting a tertiary amino monoisocyanate obtained from a tertiary aminoalcohol and a diisocyanate, with a hydroxyl group of the epoxy resin.

As examples of the amine compound in said cationizing agent, for example, the following amines may be exemplified.

(1) Primary amines such as methyl amine, ethyl amine, n- or iso-propyl amine, monoethanol amine and n-or iso-propanol amine;

(2) Secondary amines such as diethyl amine, diethanol amine, di-n- or iso-propanol amine, N-methylethanol amine and N-ethylethanolamine; and (3) Polyamines such as ethylene diamine, diethylene triamine, hydroxyethylaminoethyl amine, ethylaminoethyl amine, methylaminopropyl amine, dimethylaminoethyl amine and dimethylaminopropyl amine.

Of these amines, alkanol amines having hydroxyl groups are preferable. Also, a primary amino group of polyamines may be reacted with ketone in advance to block said group, and then the remaining active hydrogen may be reacted with an epoxy group.

Further, besides said amine compounds, a basic compound such as ammonia, hydroxylamine, hydrazine, hydroxyethylhydrazine and a N-hydroxyethylimidazoline compound may be used similarly. Basic groups formed by using these compounds may be protonated with an acid, especially preferably a water-soluble organic carboxylic acid such as formic acid, acetic acid, glycolic acid and lactic acid to be made into cationic groups.

Furthermore, tertiary amines such as triethylamine, triethanolamine, N,N-dimethylethanolamine, N-methyldiethanolamine, N,N-diethylethanolamine and N-ethyldiethanolamine may be used, they may be protonated with an acid in advance, and then reacted with an epoxy group to be made into quaternary salts.

Besides the salts of tertiary amines, salts of sulfides such as diethyl sulfide, diphenyl sulfide, tetramethylene sulfide or thiodiethanol and boric acid, carbonic acid or an organic monocarboxylic acid may be reacted with an epoxy group to make them tertiary sulfonium salts.

In addition, salts of phosphines such as triethylphosphine, phenyldimethylphosphine, diphenylmethylphosphine or triphenylphosphine and such acids as mentioned above may be reacted with an epoxy group to make them quaternary phosphonium salts.

As hydroxyl groups of the component (A) used in the present invention, there may be cited, for example, primary hydroxyl groups of alkanolamines as said cationizing agent, of ring-opening product of caprolactone which may optionally be introduced in the epoxide compound and of polyols; and secondary hydroxyl groups of epoxide resin. Of these, primary hydroxyl groups by alkanolamines are preferable because of being excellent in crosslinking reactivity with the epoxy resin (B). As such alkanolamines, what is exemplified in said cationizing agent is preferable.

The content of hydroxyl groups in the component (A) is, from the point of view of the crosslinking reactivity with the epoxy group contained in the epoxy resin (B), preferably, calculated as a hydroxyl group equivalent, within the range of 20 to 5,000, preferably 50 to 3,000, and especially 100 to 1,000. Especially, the primary hydroxyl group equivalent is preferably within the range of 200 to 1,000. The content of cationic groups is preferably in excess of the lower limit necessary for stably dispersing said component (A), and generally it is preferably within the range of 3 to 200, preferably 5 to 150, and especially from 10 to 80 calculated as amine value KOH mg/g the solids. However, even if the cationic group content is less than 3, it is possible to use it after making it an aqueous dispersion by the use of a surface active agent; in this case, however, it is desirable to adjust the cationic group so as to make the pH of the aqueous dispersed composition, usually 4 to 9, more preferably 6 to 7.

The component (A) used in the present invention has hydroxyl groups and cationic groups and is desirably free from free epoxy groups as a rule.

Component (B): This component is a curing agent for forming a crosslinked paint film mainly by an etherification reaction with the component (A) as mentioned above, which contains at least 2, preferably at least 3, specified "epoxy functional groups" on average in one molecule.

Namely, said epoxy functional group in the component (B) comprises an epoxy group directly bonded to an alicyclic ring and/or bridged alicyclic ring in which said alicyclic ring is a 4-10 member, preferably 5-6 member saturated carbon monocyclic or polycyclic ring, while said bridged alicyclic ring contains bridges (endomethylene, endoethylene, etc.) of a straight chain (linear) or branched $C_{1-6}$ (preferably $C_{1-4}$) alkylene group (for example, —$CH_2$—, —$CH_2CH_2$—, —$CH(CH_3)$—, —$CH_2(CH_3)CH_2$—, —$C(CH_3)_2$—, —$CH(C_2H_5)CH_2$—, etc.) between 2 carbon atoms constituting said monocyclic or polycyclic ring.

On the other hand, an epoxy group

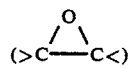

is important in that one of the carbon atoms in said epoxy group is directly bonded to the cyclic carbon atom (or atoms) of said alicyclic ring or said bridges alicyclic ring [see, for example, the following formulae (I) and (II)], or the two carbon atoms of said epoxy group are common with the two adjoining carbon atoms constituting the ring in said alicyclic ring or said bridged alicyclic ring [see, for example, the following formulae (III) and (IV)].

As the specific examples of such epoxy functional group, what is represented by the following formulae (I) to (IV) may be cited.

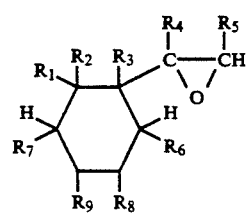

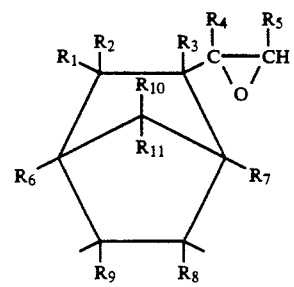

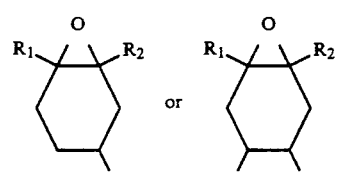

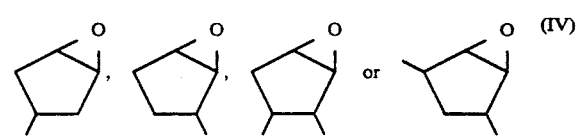

wherein
$R_1$, $R_2$, $R_3$, $R_5$, $R_6$, $R_7$, $R_{10}$ and $R_{11}$ represent H, $CH_3$ or $C_2H_5$, respectively, while $R_4$, $R_8$ and $R_9$ represent H or $CH_3$, respectively.

The component (B) used in the present invention may have at least 2, preferably at least 3, more preferably at least 4, epoxy functional groups selected from said formulae (I) to (IV) on average in one molecule. For example, the component (B) may have at least one king of the epoxy functional group represented by said formula (I) or (II), or may have at least one kind of the epoxy functional group represented by said formula (III) or (IV) in one molecule. Furthermore, the component (B) may have at least one kind of the epoxy functional group represented by said formula (I) or (II) and at least one kind of the epoxy functional group represented by said formula (III) or (IV) within one and same molecule or in different molecules.

Of the epoxy functional group represented by said formula (I) or (III) is preferable, and especially, an epoxy functional group represented by the following formula (V)

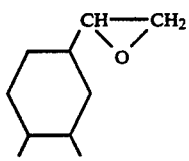 (V)

an an epoxy functional group represented by the following formula (VI) are preferable.

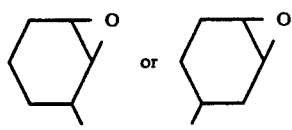 (IV)

Additionally, the epoxy equivalent and the molecular weight of the component (B) used in the present invention are not strictly restricted, but are changeable according to a process for the production thereof and the use of the end resin composition. But, generally speaking, the epoxy equivalent may be within the range of usually 100 to 2,000, preferably 150 to 500, more preferably 150 to 250.

And it is proper that the number average molecular weight is within the range of usually 400 to 100,000, preferably 700 to 50,000, more preferably 700 to 30,000.

The component having at least 2 such epoxy functional groups in one molecule is described in literatures such as, for example, Japanese Patent Publication No. 8016/1981 as well as Japanese Laid-Open Patent Publications Nos. 47365/1982, 166675/1985, 221121/1968 and 234028/1988, and what is known per se may be used.

Or said component (B) having said epoxy functional groups is obtained by processes known per se. The main processes for producing said component (B) will be enumerated hereinbelow, but the enumerated processes are not limitative.

A first process for the production:

A process for producing an epoxy resin having at least 2 epoxy functional groups in one molecule which comprises epoxidating part of carbon-carbon double bonds of an alicyclic compound (X) having said at least 2 carboncarbon double bonds in one molecule, subjecting the resulting epoxy groups to a ring-opening polymerization, and thereafter epoxidating said double bonds remaining in the resulting polymer.

A second process for the production: .

A process for subjecting an alicyclic compound (Y) having at least 2 epoxy groups in the same molecule to a ring-opening polymerization to such an extent as may not eliminate all of said epoxy groups on the basis of said epoxy groups.

A third process for the production:

A process for polymerizing a compound having an epoxy functional group and a polymerizable unsaturated bond in the same molecule.

A more specific explanation will be made with reference to these processes for the production hereinbelow.

The first process for the production

This process comprises epoxidating part of carbon-carbon double bonds (a partial epoxidation product) contained in an alicyclic compound having at least 2 carbon-carbon double bonds in one molecule hereinafter referred to as "the alicyclic compound (X)"], obtaining a ring-opened polymer of said partial epoxidation product by ring-opening polymerization of the resulting epoxy groups, and thereafter epoxidating part or whole of said double bonds remaining in said polymer to thereby obtain a component (B).

The alicyclic compound (X) is a compound having a structure of an alicyclic ring or a bridged alicyclic ring mentioned above and at least 2 carbon-carbon double bonds, existing between 2 adjoining carbon atoms constituting the ring structure or between the other carbon atoms being directly bonded to said ring structure.

The alicyclic compound (X) may also be obtained by heating, for example, a conjugated diene compound by a known method. As such conjugated diene compound, an aliphatic or alicyclic compound having 4 to 30 carbon atoms and having at least 1 pair, preferably 1 to 5 pairs of conjugated double bonds in one molecule is suitable.

Specific examples of such conjugated diene compound include butadiene, isoprene, pirylene, 1,3-hexadiene, 2,4-hexadiene, 2,4-heptadiene, 2-methyl-6-methylene-2,7-octadiene, 2,6-dimethyl-1,5,7-octatriene, cyclopentadiene, cyclohexadiene, 4-ethyl-2-methylcyclopentadiene, 3-isopropyl-1-methylcyclopentadiene, 5-isopropylcyclopentadiene, 1,2,3,4-tetraphenylcyclopentadiene, 1,2,4-triphenylcyclopentadiene, 1,4-diphenylcyclopentadiene, 1,3-octachloropentadiene, hexachlorocyclopentadiene, 5,5-diethoxy-1,2,3,4-tetrachlorocyclopentadiene, 1,2,3,4,5-pentachlorocyclopentadiene, 1,2,3,4-tetrachlorocyclopentadiene, 1,3-cycloheptadiene, 1,3-cyclooctadiene, 1,3,5-cyclooctatriene, 1,3,6-cyclooctatriene, cyclooctatetraene, chlorocyclooctatetraene, bromocyclooctatetraene and 5-cyclohexylidenecyclopentadiene. These conjugated diene compounds may be used singly or in combination, respectively.

As required, when a conjugated diene compound under heating is reacted in the presence of a Ziegler catalyst, the alicyclic compound (X) is obtained. This reaction under heating may be carried out by a method known per se, for example, by a method disclosed in Japanese Laid-Open Patent Publication No. 102643/1974.

When typical examples of the so obtained alicyclic compound (X) are shown, they are as follows.

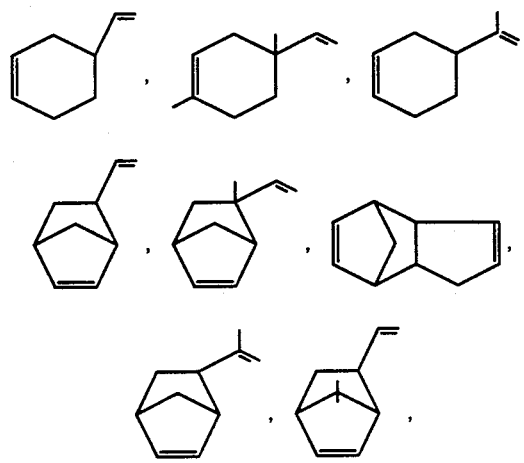

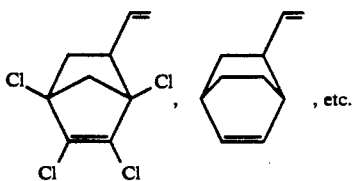

Of the aforesaid conjugated diene compounds, alicyclic compounds such as cyclopentadiene, cyclohexadiene and 4-ethyl-2-methylcyclopentadiene; and such compounds as sylvestrene, 2,8(9)-p-methadiene, pyronene, 1,3-dimethyl-1-ethyl-3,5-cyclohexadiene, terpinene, phellandrene, dipentene, iso-limonene and limonene have already structures of the alicyclic compound (X), therefore, these compounds may be used per se without being subjected to said reaction under heating.

At first, part of carbon-carbon double bonds contained in the alicyclic compound (X) is modified to epoxy groups with a peroxide and so forth (partial epoxidation). The partial epoxidation product is obtained by modifying part of a plurality of double bonds contained in said alicyclic compound (X) to epoxy groups. When specific examples of such partial epoxi-dation product are shown, they are as follows.

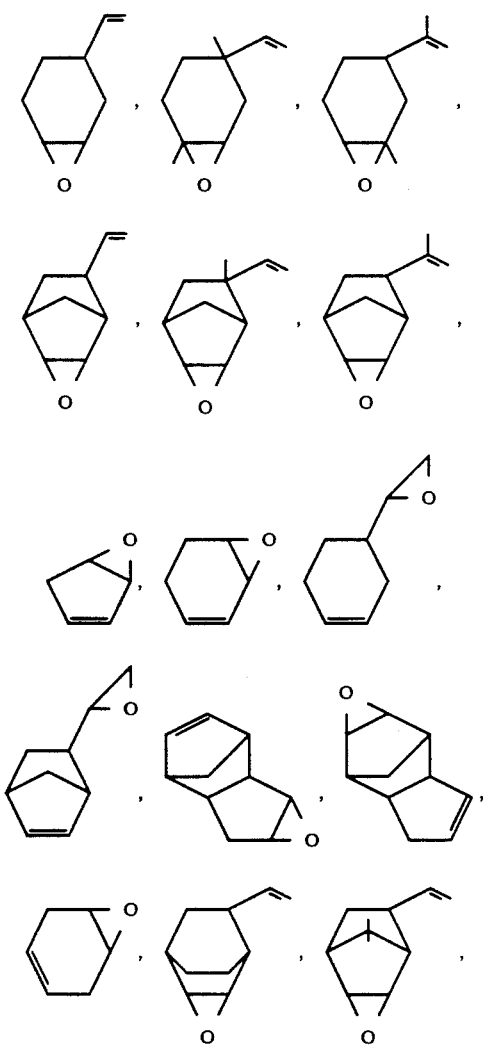

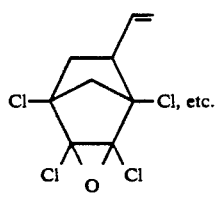

Naturally available epoxy carene represented by formula below may also be used as a partial epoxidation product.

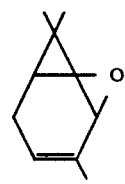

A partial epoxidation product has at least 1 epoxy group and at least 1 carbon-carbon double bond in one molecule, and said double bond is required to exist between 2 adjoining carbon atoms constituting the ring or between the other carbon atoms directly bonded to said ring.

Next, based on epoxy groups in this partial epoxidation product, a ring-opening polymerization is carried out to obtain a polymer of the alicyclic compound (X). It is preferable to use a polymerization initiator for this ring-opening polymerization, and the terminal of the end product of the component (B), a residue X by the initiator component(s) may be bonded, where X is a residue of an organic compound having active hydrogen. As an organic compound having active hydrogen which is a precursor of X, there may be cited, for example, alcohols, phenols, carboxylic acids, amines and thiols. Of these, as the alcohols, either one or monohydric alcohols or di- or higher polyhydric alcohols will do. Specific examples of the alcohols include aliphatic monohydric alcohols such as methanol, ethanol, propanol, butanol, pentanol, hexanol and octanol; an aromatic monohydric alcohol such as benzyl alcohol; and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, hydroxypivalic acid neopentyl glycol ester, cyclohexanedimethanol, glycerin, diglycerin, polyglycerin, trimethylolpropane, trimethylolethane, pentaerythritol and dipentaerythritol.

Specific examples of the phenols include phenol, cresol, catechol, pyrogallol, hydroquinone, hydroquinone monomethylether, bisphenol A, bisphenol F, 4,4'-dihydroxybenzophenone, bisphenol S, phenol resin and cresol novolak resin.

As the carboxylic acids, there may be illustrated formic acid, acetic acid, propionic acid, butyric acid, fatty acid of animal and vegetable oils; fumaric acid, maleic acid, adipic acid, dodecanoic diacid, trimellitic acid, pyromellitic acid, polyacrylic acid, phthalic acid, isophthalic acid and terephthalic acid, and further, a compound having both hydroxyl group and a carboxylic acid group such as lactic acid, citric acid and hydroxycaproic acid may be used as well.

Besides, as the other compound having active hydrogen, a mixture of water and alkoxysilane such as tetramethyl silicate, tetraethyl silicate, methyltrimethoxysilane, methyltriethoxysilane, dimethyldimethoxysilane and phenyltrimethoxysilane or silanol compounds of these; polyvinyl alcohol, a polyvinyl acetate partial hydrolyzed product, starch, cellulose, cellulose acetate, cellulose acetate butyrate, hydroxyethyl cellulose, acrylpolyol resin, styrene-allyl alcohol copolymer resin, styrene-maleic acid copolymer resin, alkyd resin, polyesterpolyol resin and polycaprolactonepolyol resin may be also used. Such compound may have an unsaturated double bond together with active hydrogen, further, said unsaturated double bond may be epoxidated. And a catalyst and a polymerization initiator may be the same like an alkoxy metal compound.

Usually, the aforesaid organic compound having active hydrogen is used as a polymerization initiator, while the aforesaid partial epoxidation product such as, for example, 4-vinylcyclohexene-1-oxide, 4-vinylcyclo[2,2,1]-3-methyl-4(or 5)-t-propenyl-1-cyclohexene oxide, 2,4- or 1,4-dimethyl-4-ethenyl-1-cyclo hexene oxide, 4-vinylcyclo[2,2,1]-heptene-1-oxide (vinyl norbornene oxide) and 2-methyl-4-isopropanyl-cyclohexene oxide are used singly or in combination upon carrying out a ring-opening polymerization. At this time, it is also possible to carry out a ring-opening polymerization in the co-presence of the other epoxy compound but belonging to said partial epoxidation product. As the other copolymerizable epoxy compound, any compound will do so long as it has an epoxy group, but suitable examples of such other copolymerizable epoxy compound include an oxide of an unsaturated compound such as ethylene oxide, propylene oxide, butylene oxide and styrene oxide; a glycidyl ether compound such as allylglycidyl ether, 2-ethylhexylglycidyl ether, methylglycidyl ether, butylglycidyl ether and phenylglycidyl ether; unsaturated organic carboxylic acid glycidyl ester compound such as acrylic acid and methacrylic acid; and an alicyclic oxirane group-containing vinyl monomer such as 3,4-epoxycyclohexyl methyl (meth)acrylate.

The aforesaid ring-opened polymer is obtained by ring-opening polymerizing epoxy groups contained in a partial epoxidation product alone or as required in the other epoxy compound made to be co-present with said partial epoxidation product to form an ether bond. The proportion of the other epoxy compound in a ring-opened polymer may be optionally selected in accordance with the object, but specifically, it is desirable to select said epoxy compound within such a range of proportion that said compound may have at least 2, preferably at least 3, more preferably at least 4, of one or more kinds of said structural formulae (I) to (IV) on average per molecule of the resulting ring-opened polymer. It is preferable that the number average molecular weight of the so obtained (co)polymer is within the range of usually from 400 to 100,000, especially from 700 to 50,000, more especially 700 to 30,000.

It is generally preferable to carry out a ring-opening polymerization reaction in the presence of a catalyst.

Specific examples of the catalyst that can be used include amines such as methylamine, ethylamine, propylamine and piperazine; organic bases such as pyridines and imidazoles; organic acids such as formic acid, acetic acid and propionic acid; inorganic acids such as sulfuric acid and hydrochloric acid; alkali metal alcoholates such as sodium methylate; alkalis such as KOH and NaOH: Lewis acid or its complexes such as $BF_3$, $ZnCl_2$, $AlCl_3$ and $SnCl_4$; and organometallic compounds such as triethylaluminum, aluminum acetylacetonate, titanium acetylacetonate and diethylzinc.

These catalysts may be used in amounts within the range of generally 0.001 to 10 % by weight, preferably 0.1 to 5 % by weight based on the reactant. The ring-opening polymerization temperature is within the range of generally about $-70°$ to about $200°$ C., preferably about $-30°$ to about $100°$ C. The reaction may be carried out in the presence of a solvent, and it is preferable to use an ordinary organic solvent not having active hydrogen as a solvent.

In the ring-opened polymer, there are double bonds derived from the alicyclic compound (X), and the component (B) is obtained by epoxidating part or whole of said double bonds. Epoxidation of the double bonds may be carried out by using an epoxidation agent such as, for example, peroxy acids and hydroperoxides. Whether a solvent should be used or not and the reaction temperature in the epoxidation reaction may be properly adjusted according to the apparatus used and the physical properties of the starting material. Depending on the conditions of the epoxidation reaction, simultaneous with epoxidation of the double bonds in the ring-opened polymer as a starting material, a side reaction occurs and the modified substituent may be contained in the skeleton of the component (B) sometimes. As such modified substituent, when, for example, peracetic acid is used as the epoxidation agent, a substituent of the following structure may be cited, which is considered to be attributable to reaction of the produced epoxy group with the byproduced acetic acid.

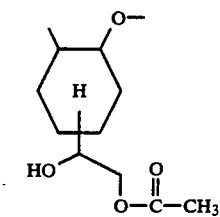

The ratio at which these substituents are contained in said skeleton is determined according to the kind of the epoxidation agent, the molar ratio of the epoxidation agent to the unsaturated bond and the reaction conditions.

The epoxy equivalent of the so obtained component (B) is preferably within the range of generally to 2,000, especially 150 to 500, more especially 150 to 250.

As such component (B), what is commercially available may also be used, and as such merchandise, for example, EHPE-3150, EHPE-3100 and EHPE-1150 (trade names of products of Daicel Chemical Industries, Ltd.) may be cited. These are epoxy resins of the following structural formula having cyclohexene skeletons using 4-vinylcyclohexene-1-oxide as a partial epoxidation product for their production.

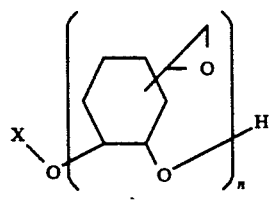

wherein n is at least 2, preferably at least 3, more preferably at least 4.

The second process for the production:

According to this process, the objective epoxy resin is obtained by, for example, epoxidating at least 2 double bonds of the double bonds contained in said alicyclic compound (X), and thereafter subjecting said compound (X) to a ring-opening polymerization in such a manner as to retain the resulting epoxy groups.

As said epoxidation product (i.e. alicyclic compound (Y)) having at least 2 epoxy groups an average per molecule, the following monocyclic or condensed ring-type compounds may be shown as typical examples.

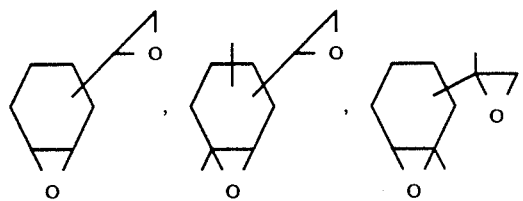

(For example,
a product under a trade name of "Celoxide" of Daicel Chemical Industries, Ltd. may be cited),

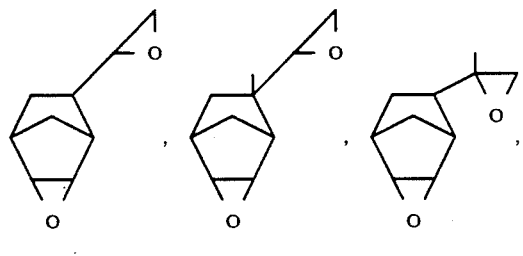

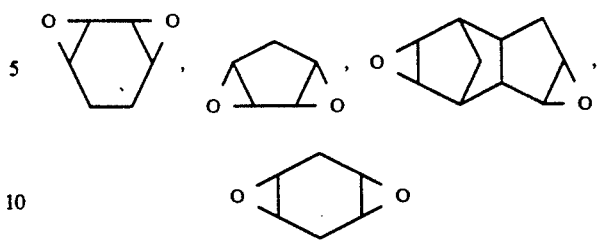

Specifically, at least one kind of said epoxy compound is subjected to a ring-opening polymerization, as required in the presence of a polymerization initiator and a catalyst in the same way as in the first process for the production mentioned above and the reaction is suspended at the predetermined reaction stage in which epoxy groups are remaining to thereby obtain the component (B). For suspending the reaction, optional means such as dilution with a solvent and cooling may be used. In this process for the production, said other epoxy compound may be copolymerized as in said first process for the production as well.

The so obtained component (B) may be an epoxy resin having at least one kind of the epoxy functional group shown by said formula (I) or (II) and at least one kind of the epoxy functional group shown by said formula (III) or (IV) in the same molecule or different molecules.

The so obtained ring-opened polymer the curing resin (B)) preferably has a number average molecular weight within the range of generally 400 to 100,000, especially 700 to 50,000 and conveniently has an epoxy equivalent within the range of generally 100 to 2,000, especially 150 to 500, more especially 150 to 250.

The third process for the production

As a compound (Z) having at least one epoxy functional group and a polymerizable unsaturated bond in the same molecule, there may be cited, for example, what is represented by the following general formulae ① to ⑫.

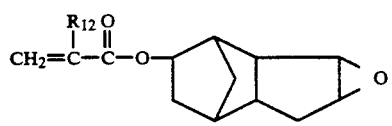

①

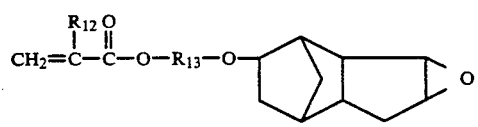

②

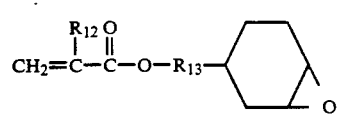

③

-continued

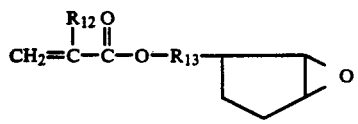 ④

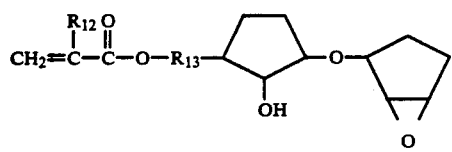 ⑤

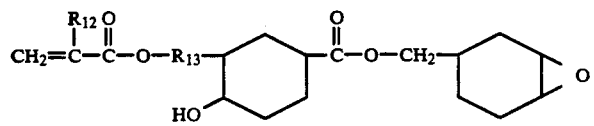 ⑥

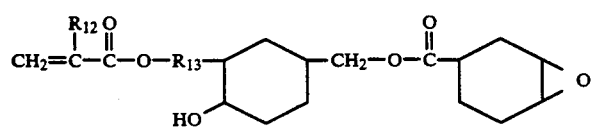 ⑦

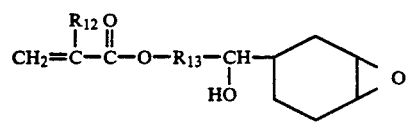 ⑧

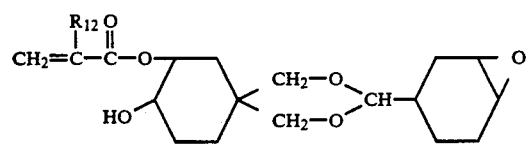 ⑨

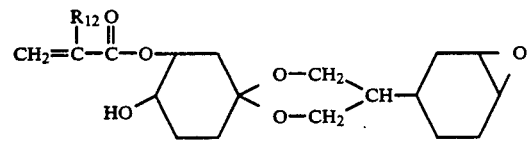 ⑩

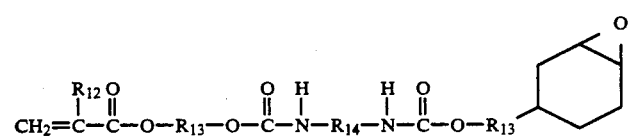 ⑪

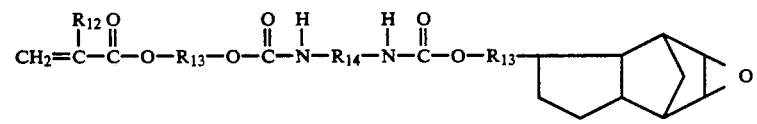 ⑫

In said general formulae, $R_{12}$ represents a hydrogen atom or a methyl group, $R_{13}$ represents a divalent aliphatic saturated hydrocarbon group having 1 to 6 carbon atoms, and $R_{14}$ represents a divalent hydrocarbon group having 1 to 10 carbon atoms.

In the aforesaid compound (Z), as a divalent aliphatic saturated hydrocarbon group having 1 to 6 carbon atoms represented by $R_{13}$, there may be cited a straight chain linear or branched chain alkylene group such as, for example, methylene, ethylene, propylene, tetramethylene, ethylethylene, pentamethylene and hexamethylene. As a divalent hydrocarbon group having 1 to 10 carbon atoms represented by $R_{14}$, there may be cited, for example, methylene, ethylene, propylene, tetramethylene, ethylethylene, pentamethylene, hexamethylene, polymethylene, phenylene,

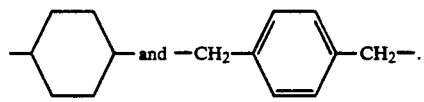

Specific examples of the compound (Z) represented by the aforesaid general formulae ① to ⑫ include 3,4-epoxycyclohexylmethyl acrylate and 3,4-epoxycyclohexylmethyl methacrylate. They are commercially available, for example, under trade names of "METHB" and "AETHB", both products of Daicel Chemical Industries, Ltd. They have the epoxy functional group represented by said formula (I) or (II). Further, 4- vinylcyclohexene oxide may also be used as a compound (Z).

The component (B) may be produced by polymerizing one kind or at least two kinds of monomers selected from the compound (Z), and at this time, it is also possible to copolymerize the other polymerizable unsaturated monomer.

As said the other polymerizable unsaturated monomer, it may be selected from a broad range according to the properties desired of the resulting (co)polymer. Typical examples of such other polymerizable unsaturated monomer include the following compounds.

(a) Acrylic acid or methacrylic acid esters: for example, alkyl esters having 1 to 18 carbon atoms of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; alkoxyalkyl esters having 2 to 18 carbon atoms of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; alkenyl esters having 2 to 8 carbon atoms of acrylic acid or methacrylic acid such as allyl acrylate and allyl methacrylate; hydroxyalkyl esters having 2 to 8 carbon atoms of acrylic acid or methacrylic acid such as 2-hydroxyethyl acrylate, 2-hydroxyethyl methacrylate, hydroxypropyl acrylate and hydroxypropyl methacrylate; and alkenyloxyalkyl esters having 3 to 18 carbon atoms of acrylic acid or methacrylic acid such as allyloxyethyl acrylate and allyloxyethyl methacrylate.

(b) Vinyl aromatic compounds: for example, styrene, alpha-methyl styrene, vinyl toluene and p-chlorostyrene.

(c) Polyolefin type compounds, for example, butadiene, isoprene and chloroprene.

(d) Others: acrylonitrile, methacrylonitrile, methylisopropenyl ketone, vinyl acetate, VEOBA monomer (a product of Shell Chemicals), vinyl propionate, vinyl pivalate and a compound having a polycaprolactam chain (for example, FM-3X monomer, a trade name of a product of Daicel Chemical Industries, Ltd.)

The ratio of the compound (Z) to the other polymerizable unsaturated monomer may be optionally selected according to the object, within such a range as to enable the component (B) obtained by these copolymerization reactions to contain at least 2, preferably at least 3, more preferably at least 4, epoxy functional groups on average in one molecule. But in order to invest the resulting polymer with sufficient curability, it is especially preferable to make the content of the polymerizable epoxy monomer in the solids content of said component (B) within the range of 5 to 100 % by more preferably 20 to 100 % by weight.

Said third process for the production of the component (B) may be carried out in the same manner as the polymerization reaction of ordinary acryl or vinyl resin monomers. As one of such polymerization reactions, a process which comprises dissolving or dispersing the respective monomer components in an organic solvent, and heating the resulting solution or dispersion at a temperature of about 60° to 180° C. with stirring in the presence of a radical polymerization initiator, may be shown. The reaction time may be normally about 1 to 10 hours. As the organic solvent, alcohol solvents, ether solvents, ester solvents and hydrocarbon solvents may be used. When the hydrocarbon solvent is used, it is preferable to use another cosolvent together with it from the standpoint of the solubility. Further, all of usually used radical polymerization initiators may be used. As the specific examples of such radical initiator, there may be exemplified peroxides such as benzoyl peroxide and t-butyl peroxy-2-ethyl hexanoate; and azo compounds such as azobisisobutyronitrile and azobisdimethylvaleronitrile.

It is preferable that the component (B) obtained by said third process for the production has a number average molecular weight within the range of generally about 3,000 to about 100,000, especially 4,000 to 3,000.

Of the aforesaid component (B), the epoxy resin which is most suitable for use in applications requring high performances such as a cationically electrodepositable paint used for coating car bodies has at least 3 epoxy functional groups, more preferably at least 4 such groups, most preferably at least 5 such groups, on average per molecule, an epoxy equivalent within the range of preferably 100 to 2,000, more preferably 150 to 500, especially preferably 150 to 250, and a number average molecular weight within the range of preferably 400 to 100,000, more preferably 700 to 50,000, especially preferably 700 to 30,000.

The amount of the component (B) to be used is properly changeable according to the kind of the component (A) used and within the range from the minimum amount enough to thermally cure the resulting paint film to the maximum amount not hurting the bath stability, but generally it is desirably within such a range that the weight ratio of the solids content of the component (B) to the component (A) becomes 0.2 to 1.0, especially 0.25 to 0.85, more desirably 0.25 to 0.65.

The resin composition of the present invention may contain the component (B) together with the component (A) in advance. Component (C): This component is a finely divided gelled polymer which is internally crosslinked and has incorporated a group having a surface activity by chemical bond i the surface of the resin. This finely divided gelled polymer has a good dispersion stability, and when added to a coating composition comprising the component (A) and (B) above, it is very effective for improving the edge covering property of the coated film without adversely affecting various properties, such as water resistance, solvent resistance and chemical resistance, of the cationically electrodeposited film.

The component (C) can be obtained, for example, by emulsion polymerizing (C-1) a polymerizable monomer having at least two radically polymerizable unsaturated groups in the molecule and (C-2) a radically polymerizable unsaturated monomer other than the one mentioned in (C-1) above as indespensable components in the presence of a cationically reactive emulsifier having an allyl group in the molecule, and optionally using a water-soluble azoamide compound as a polymerization initiator.

As described above, the finely divided gelled polymer (C) preferably comprises (C-1) a polymerizable monomer having at least two radical polymerizable unsaturated groups in the molecule, and (C-2) a polymerizable monomer having a vinylic double bond other than said monomer (C-1).

The polymerizable monomer having at least two radically polymerizable unsaturated groups in said (C-1) includes a polymerizable unsaturated carboxylic acid ester of a polyhydric alcohol, a polymerizable unsaturated alcohol ester of a polybasic acid and an aromatic monomer substituted with at least two, preferably two or three, vinyl groups.

As the polyhydric alcohol, there can be cited, for example, alkylene glycols having 2-16, preferably 2-10 carbon atoms; and tri- or tetra-hydric saturated aliphatic alcohol such as glycerin, trimethylolethane, 1,1,1-tris(hydroxylmethyl)ethane, 1,1,1-tris(hydroxymethyl)propane and pentaerythritol.

As the polymerizable unsaturated monocarboxylic acid which can form esters with said polyhydric alcohols, there can be cited, for example, acrylic acid, methacrylic acid and crotoni acid. The above-described polybasic acid includes polycarboxylic acids having 2-4 carboxyl groups in one molecule such as adipic acid, azelaic acid, sebacic acid, phthalic acid, isophthalic acid, terephthalic acid, tetrahydrophthalic acid, hexahydrophthalic acid and maleic acid.

As the polymerizable unsaturated alcohol which can form an ester with such a polycarboxylic acid as mentioned above, there can be cited, for example, hydroxyethyl acrylate, hydroxyethyl methacrylate, hydroxylpropyl acrylate, and hydroxypropyl methacrylate. Further, glycidyl acrylate, glycidyl methacrylate, and the like can also be used.

The aromatic rings in the above-described aromatic compounds may be monocyclic or polycyclic, and also may be carboxylic or heterocyclic. Examples of the aromatic rings include benzene ring, and naphthalene ring.

Specific examples of the polymerizable (C-1) include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethylethane diacrylate, 1,1,1-trishydroxymethylethane triacrylate, 1,1,1-trihydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate and divinyl benzene.

Of the aforesaid monomers (C-1), the polymerizable unsaturated carboxylic acid ester of a polyhydric alcohol and the aromatic monomer substituted with at least two vinyl monomers are preferable for this invention. Of these, ethylene glycol di(meth)acrylate, triethylene glycol dimethacrylate, tetraethylene glycol dimethacrylate, 1,3-butylene glycol dimethacrylate, 1,4-butanediol diacrylate, neopentyl glycol diacrylate, 1,6-hexanediol diacrylate and divinyl benzene are especially preferable.

The radically polymerizable unsaturated monomer (C-2) hereinafter referred to as "the polymerizable monomer (C-2)" is another half of the monomers constituting the finely divided gelled polymer (C) used in this invention, which includes the monomers belonging to the following groups (I) to (XII).

(I) A polymerizable unsaturated vinyl silane monomer containing a vinylic double bond and a hydrolyzable alkoxy silane group:

For example, a compound represented by the general formula

$R_3SiX$.

In the formula, X represents a vinylic unsaturated group such as gamma-methacryloxypropyl and R represents an acetoxy group or an alkoxy group having 1 to 8 carbon atoms.

Examples of the alkoxy group include besides $C_{1-8}$-alkoxy groups such as methoxy, ethoxy, propoxy, butoxy, isobutoxy, pentoxy and hexoxy; broadly alkoxyalkoxy groups such as methoxymethoxy, ethoxymethoxy, alkoxyallyloxy and ethoxyphenoxy, and $C_{1-8}$-alkoxyaryloxy groups; $C_{1-8}$-alkoxyphenoxy groups. The preferable R is the alkoxy groups, especially a methoxy or ethoxy group.

The silane monomer is known per se or can be prepared similarly to the known compounds.

Typical examples of the monomer include vinyl trimethoxysilane, vinyltriethoxysilane, vinyltris(2-methoxyethoxy)silane, gamma-methacryloxypropyl trimethoxysilane and vinyltriacetoxysilanes. Of these, the most preferable is gamma-methacryloxypropyl trimethoxysilane.

When the silane monomer is used, a component (C) having an alkoxysilane group can be obtained.

When it is added to a cationically electrodepositable paint, this component (C) does not impair the water resistance, corrosion resistance and smoothness of the surface of the coated film because of crosslinking between particles and crosslinking between the polymer particles with the components (A) and (B) derived from condensation of a silanol group formed by the hydrolysis of alkoxy silane group with another silanol group and a hydroxyl group at the time of baking, and is very effective for prevention of the cissing and improvement of the edge covering property, the adhesivity and the chipping resistance of the cationically electrodeposited coated (II) A polymerizable unsaturated monomer containing a vinylic double bond and a hydroxyl group: When this monomer is used, hydroxyl groups can be incorporated in the finely divided gelled polymer (C). The hydroxyl groups serve as a hydrophilic group or functional group responsible for crosslinking reaction between dispersed particle upon preparing the finely divided gelled polymer (C). As the unsaturated monomer, there may be cited, for example, $C_{2-8}$-hydroxyalkyl (meth)acrylates such as 2-hydroxyethyl (meth)acrylate, hydroxypropyl (meth)acrylate, and hydroxybutyl (meth)acrylate; allyl alcohol and methallyl alcohol.

(III) Polymerizable unsaturated monomer containing an amino group:

This monomer includes (meth)acrylic acid esters containing an substituted or unsubstituted amino group in the ester moiety and (meth)acrylic acid amides and (meth)acrylic acid amides containing a substituted amino group in the amide moiety. Particularly preferred are aminoalkyl (meth)acrylates and aminoalkyl (meth)acrylamides represented by the following formulae (VIII) or (IX):

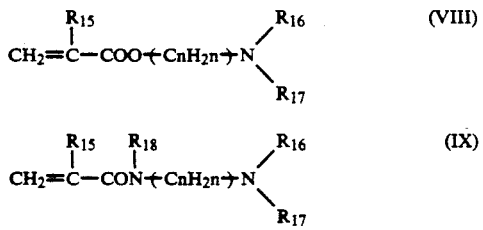

wherein $R_{15}$ represents a hydrogen atom or a methyl group; $R_{16}$ and $R_{17}$ independently represent a hydrogen atom or a lower alkyl group; $R_{18}$ represents a hydrogen atom or a lower alkyl group; and n is an integer of 2 to 8.

Here, by the term "lower" it is meant that the alkyl groups under this have not more than 6 carbon atoms, preferably not more than 4 carbon atoms.

Specific examples of the nitrogen-containing (meth)acrylic type monomer include the following compounds. That is, the aminoalkyl (meth)acrylate represented by the formula (VIII) above includes, for example, N,N-dimethylaminoethyl (meth)acrylate, N,N-diethylaminoethyl (meth)acrylate, N-t-butyl-aminoethyl (meth)acrylate, N,N-dimethylaminopropyl (meth)acrylate, N,N-dimethylaminobutyl (meth)acrylate, N-propylaminoethyl (meth)acrylate and N-butylaminoethyl (meth)acrylate, and the aminoalkyl (meth)acrylamide represented by the formula (IX) above includes, for example, N,N-dimethylaminoethyl (meth)acrylamide and N,N-dimethylaminopropyl (meth)acrylamide.

(IV) A polymerizable unsaturated monomer containing a carboxyl group:

For example, there may be cited acrylic acid, methacrylic acid, crotonic acid, itaconic acid, maleic acid and fumaric acid.

(V) A polymerizable unsaturated amide monomer:

For example, there may be cited acrylamide, methacrylamide, N,N-di(lower alkyl) (meth)acrylamide such as N,N-dimethylacrylamide and N,N-di(lower alkyl) amino(lower alkyl) (meth)acryamide such as N,N-dimethylamino propyl acrylamide.

(VI) A polymerizable unsaturated nitrile monomer:

For example, there may be cited acrylonitrile and methacrylonitrile.

(VII) A $C_1$-$C_{16}$ alkyl (meth)acrylate monomer;

For example, there may be cited methyl (meth)acrylate, ethyl (meth)acrylate, n-butyl (meth)acrylate and 2-ethylhexyl (meth)acrylate.

(VIII) A polymerizable unsaturated glycidyl monomer;

For example, there may be cited glycidyl (meth)acrylate and allyl glycidyl ether.

(XI) A polymerizable aromatic monomer:

For example, there may be cited styrene, alpha-methylstyrene, vinyltoluene and t-butylstyrene.

(X) An alpha-olefin monomer:

For example, there may be cited ethylene and propylene.

(XI) An vinyl ester monomer:

For example, there may be cited vinyl acetate and vinyl propionate.

(XII) A diene monomer:

For example, there may be cited butadiene and isoprene.

These monomers (C-2) may be properly selected according to the desired characteristics of the finely divided gelled polymer and may be used singly or in combination of at least two.

Basic compositions of the polymerizable monomer for preparing the component (C) used in the present invention comprises the component (C-1) and the component (C-2) (Composition C-a). Among them, preferred are a monomer composition (C-b) composed of a combination of the component (C-1), the component [C-2, monomer(I)], the component C-2, monomer (II)-]and the other component (C-2) other than these [for example, components C-2 monomers (III) to (XIII)]; or a monomer composition (C-c) composed of a combination of the component (C-1), the component [C-2, monomer (I)], the component [C-2, monomer (II)], the component [C-2, monomer (III)] and the other component (C-3) other than these for example, components C-2, monomers (IV) to (XII)).

The blending ratio of the polymerizable monomers for preparing the finely divided gelled polymer (C) is not limited particularly, but selected properly depending on the purpose. Usually, the blending ratio is desirably within the following range.

(C-a):

Component (C-1): 1 to 99 % by weight, preferably 2 to 50 % by weight, more preferably 3 to 20 % by weight Component (C-2): 1 to 99 % by weight, preferably 50 to 98 % by weight, more preferably 80 to 97 % by weight (C-b):

Component (C-1): 1 to 30 % by weight, preferably 3 to 20 % by weight

Component [C-2, monomer (I)]: 1 to 30 % by weight, preferably 3 to 20 % by weight Component [C-2, monomer (II)]: 1 to 30 % by weight, preferably 3 to 20 % by weight Other monomer: 10 to 97 % by weight, preferably 40 to 91 % by weight (C-c):

Component (C-1): 1 to 30 % by weight, preferably 3 to 20 % by weight

Component [C-2, monomer (I)]: 1 to 30 % by weight, preferably 3 to 20 % by weight Component [C-2, monomer (II)]: 1 to 30 % by weight, preferably 3 to 20 % by weight Component [C-2, monomer (III)]: 1 to 10 % by weight, preferably 2 to 5 % by weight Other monomer: 0 to 96 % by weight, preferably 35 to 89 % by weight As the reactive emulsifier containing an allyl group in the molecule, there can be cited the following. It is preferred to use a cationic emulsifier alone or a mixture of a cationic emulsifier and a nonionic emulsifier.

(I) An allyl group-containing cationic reactive emulsifier:

A typical example is a reactive emulsifier having a quaternery ammonium salt represented by the following general formula

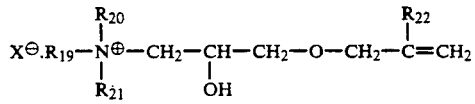

Wherein $R_{19}$ represents a hydrocarbon group having 8 to 22 carbon atoms optionally having a substituent, $R_{20}$ and $R_{21}$ represent an alkyl group having 1 to 3 carbon atoms, $R_{22}$ represents a hydrogen atom or a methyl group and X represents a univalent anion.

This compound is known (see, for example, Japanese Laid-Open Patent Publication No. 78947/1985) and is commercially available under the tradename of "Ratemuru K-180" (Kao Corporation).

Of the aforesaid emulsifiers, a cationic reactive emulsifier which is gradually incorporated in the polymer during the polymerization is suitable, and if it is a cationic reactive emulsifier containing an allyl group which is a group relatively low in reactivity, it is not limited to what is mentioned above only, but includs a broad range of compounds.

(II) An allyl group-containing nonionic re active emulsifier:

What is typical of this category is a compound represented by the following general formula

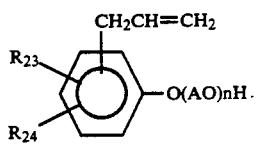

wherein $R_{23}$ and $R_{24}$ each represent an alkyl group having 4 to 18 carbon atoms, an alkenyl group having 2 to 18 carbon atoms or an aralkyl group having 7 to 18 carbon atoms, $A_1$ represents an alkylene group having 2 to 4, carbon atoms or a substituted alkylene group (for example, isoprene), and n is an integer of 2 to 200.

This compound is known (see Japanese Laid-Open Patent Publication No. 100502/1987) and commercially available under the trade name of "H-3355N" (Dai-ichi Kogyo Seiyaku Co., Ltd.).

The reactive emulsifier containing an allyl group in the molecule used for the production of the component (C) is a cationic emulsifier alone or a mixture of a cationic emulsifier and a nonionic emulsifier, with the use of a cationic emulsifier alone being preferred.

The amount of the reactive emulsifier containing an allyl group used is usually 0.1 to 30 parts by weight, preferably 0.3 to 20 parts by weight, more preferably 0.5 to 5 parts by weight per 100 parts by weight of the solids content of the finely divided gelled polymer.

When the cationic emulsifier and the nonionic emulsifier are used in combination, the amount of the cationic emulsifier used is 100 to 1 % by weight, preferably 100 to 30 % by weight while the amount of the nonionic emulsifier used is 0 to 99 % by weight, preferably 0 to 70 % by weight, both based on the total weight of the solids contents of the both emulsifiers. As a polymerization initiator used for the production of the component (C) in this invention, a water-soluble azoamide compound represented by the following general formula

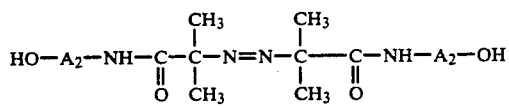

wherein $A_2$ represents a linear-chain or branched-chain alkylene group having 2 to 12 carbon atoms, or represented by the following general formula

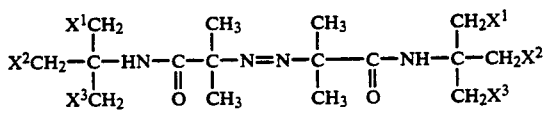

Wherein at least one of $X^1$, $X^2$ and $X^3$ represents a hydroxyl group and the remaining represents a hydrogen atom, is especially suitable.

This compound is known (see Japanese Laid-Open Patent Publications Nos. 218618/1986 and 63643/1986, U.S. Pat. No. 4,746,715 et al.) and is commercially available under the trade name of "VA Series" (Wako Pure Chemicals Industries, Ltd,).

The necessary amount of the polymerization initiator is not limited particularly but the optinum amount thereof may be usually within the range of 0.1 to 1.5 parts by weight per 100 parts by weight of the solids content of the finely divided gelled polymer.

Copolymerization of the unsaturated monomers (C-1) and (C-2) may be carried out by the known process for emulsion polymerization, viz. a process for producing an acryl copolymer. More specifically, a mixture of the monomers may be reacted in the presence of a polymerization initiator of a water-soluble azoamide compound at a reaction temperature of usually about 50° C. to about 100° C., preferably about 80° C. to about 95° C. for about 1 to about 20 hours.

The finely divided gelled polymer (C) used in this invention usually in the form of an aqueous dispersion may have a solids resin content of usually about 10 to about 40% by weight based on the total amount of its aqueous dispersion. The particle diameter of the finely divided gelled polymer is less than 50 nm, preferably 10 to 300 nm, more preferably 50 to 100 nm. The particle diameter can be adjusted by adjusting the amount and/or the ratio of the amount of the reactive emulsifier having an allyl group in the molecule, and a finely divided gelled polymer having a particle diameter within the desired range can be easily obtained.

While the amount of the finely divided gelled polymer (C) to be used may be varied properly depending upon the types of the components (A) and (B), usually it is preferred to select said amount such that the polymer (C) occupies 5 to 30% by weight, preferably 10 to 20% by weight, more preferably 7 to 25% by weight, of the sum of said components (A) and (B) on the basis of solids content.

The method of preparing the resin composition of the invention is not limited particularly. Basically, it can be obtained by dispersing the components (A), (B) and (C) in water. It is preferred, however, to at first disperse the components (A) and (B) in water stably, and then mix the resulting aqueous dispersion with separately formed aqueous dispersion of the component (C).

Then, as required, the resulting aqueous dispersion is added with a color pigment such as carbon black, titanium white, white lead, lead oxide and red iron oxide; an extender pigment such as clay and talc; an anticorrosive pigment such as strontium chromate, lead chromate, basic lead chromate, red lead, lead silicate, basic lead silicate, lead phosphate, basic lead phosphate, lead tripolyphosphate, lead silicochromate, chrome yellow, lead cyanamide, calcium plumbate, lead suboxide, lead sulfate and basic lead sulfate; or further with other additives. As the other additives that can be added, for example, a small amount of a dispersant or a nonionic surface active agent as a cissing preventing agent for the coated surface; and curing promotor may be cited.

Thus, the resin composition of the invention may be used for forming a protective coat on various substrate especially as a resin for a cationically electrodepositable paint.

For making a cationically electrodeposited paint formed on substrates using a cationically electrodepositable paint containing the resin composition of the invention sufficiently curable at a low temperature of not more than 160° C., it is effective to add one kind or at least two kinds of metal compound selected from among a lead compound, a zirconium compound, a cobalt compound, an aluminum compound, a manganese compound, a copper compound, a zinc compound, an iron compound, a chromium compound and a nickel compound as a catalyst.

Specific examples of these metal compounds include chelated compounds such as zirconium acetylacetonate, cobalt acetylacetonate, aluminum acetylacetonate and manganese acetylacetonate; a chelation reaction product of compounds having beta-hydroxyamino structures with lead oxide (II); and carboxylates such as lead 2-ethyl hexanoate, lead oenanthate, naphthex lead, lead octanoate, lead benzoate, lead acetate, lead lactate, lead formate, lead glycoate and zirconium octanoate.

Said metal compounds may be used in an amount calculated as a metal content based on the weight of the total solids content of the component (A) and the component (B) of generally not more than 10% by weight, preferably not more than 5% by weight.

The thickness of a paint film obtained by electrodepositing the so prepared resin composition for a cationically electrodepositable paint on a proper substrate is not strictly restricted, however, generally, the thickness within the range of 3 to 200 microns based on the cured paint film is suitable, and the paint film can be cured with heating at a temperature of, for example, 70° to 250° C., preferably 120° to 160° C.

A method of forming an electrodeposited paint film on the substrate using the resin composition for a cationically electrodepositable paint of the present invention is not particularly restricted, but ordinary conditions for cationically electrodepositing may be used. For example, the component (A) and the component (B) used in this invention are, as mentioned above, dispersed in water, the component (C) is added to the resulting aqueous dispersion, which is then blended with, as required, pigments, a curing catalyst and other additives, further, the mixture is diluted to the concentration of the solids content of the bath within the range of 5 to 40% by weight, preferably 10 to 25% by weight, and the bath pH is adjusted within the range of 5 to 8, preferably 5.5 to 7. Next, using this electrodeposition bath, electrodeposition is carried out under the following conditions with, for example, a carbon plate (5 cm × 15 cm × 1 cm) being used as an anode and for example, a zinc phosphated steel (5 cm × 15 cm × 0.7 mm) being used as a cathode.

Bath temperature: 20° to 35° C., preferably 25° to 30° C.

Direct current

Current density: 0.005 to 2 A/cm$^2$, preferably 0.01 to 1 A/cm$^2$

Voltage 10 to 500 V, preferably 100 to 300 V

Power feeding time: 0.5 to 5 min., preferably 2 to 3 min.

After the electrodeposition coating, the coated object is drawn up from the electrodeposition bath and rinsed with water, and then the moisture contained in the electrodeposited film is removed by during means suchj as hot air.

Thus, electrodeposited film formed using the resin composition of the invention can be cured thermally by heating as mentioned above.

The electrodeposited thermally sured coated film prepared according to the present invention is excellent in both smoothness and edge covering property. That is, it is considered that upon curing of the coated film by crosslinking as a result of reaction between the component (A) and the component (B), substantially no by-product is formed and therefore no volumetric shrinkage occurs in the coated film, resulting in that smoothness as well as adhesion of the coated film are excellent. On the other hand, it is inferred that the component (C) has hydroxyl groups effectively incorporated in the polymer by chemical bonding from the watersoluble azoamide compound serving as a polymerization initiator. The finely divided gelled polymer (component (C)) forms a pseudo-network structure due to hydrogen bonds attributable to the hydroxyl groups, which structure is then converted as is to a true network structure by formation of ether bonds when the coated film is heated to prevent melt flow of the coated film, resulting in the improvement in the edge covering property. However, substantially no decrease in the smoothness of the coated film by blending the component (C). Further, it is probable that the hydroxyl groups in the component (C) react with the epoxy groups in the component (B). In addition, having a good affinity for water, the components (C) is excellent in stability in water.

The resin composition of theinvention can be used widely as a resin compostion for a cationically electrodeposited paint in the field of, for example, outer ply coating for various vehicles such as ccars, trucks, buses and motor cycles.

Hereinbelow, the present invention will be explained more specifically by examples. All parts and percentages in the following examples are by weight.

I. Production Examples

1. Production of Component (A)

(1-1) (A-1):

Bisphenol A type epoxy resin having an epoxy equivalent of 950 (trade name "Epikote 1004", a product of Shell Chemicals Co., Ltd.) (1900 parts) was dissolved in 993 parts of butyl cellosolve, to the resulting solution, 210 parts of diethanolamine was added dropwise at a temperature of 80° to 100° C., then the resultant mixture was maintained at 100° C. for 2 hours to obtain a component (A-1) having a primary hydroxyl equivalent of 528 and an amine value of 53.

(1-2) (A-2):

To 39 parts of monoethanolamine maintained at 60° C. in a reactor, 100 parts of N,N-dimethylaminopropylacrylamide was added dropwise, the mixture was reacted at 60° C. for 5 hours to obtain a monoethanolamine adduct of N,N-dimethylaminopropylacrylamide.

Separately, a reactor was charged with 950 parts of bisphenol A diglycidylether having an epoxy equivalent of 190, 340 parts of propylene glycol diglycidyl ether having an epoxy equivalent of 340, 456 parts of bisphenol A and 21 parts of diethanolamine, the content was heated to 120° C. and reacted until the epoxy value became 1.02 mmole/g, then the reaction product was diluted with 479 parts of ethylene glycol monobutyl ether, cooled, and while the reaction system was maintained at 100° C., 158 parts of diethanolamine and 43 parts of a monoethanolamine adduct of said N,N-dimethylaminopropylacrylamide were added thereto, and the resulting mixture was reacted until the viscosity ceased to rise to obtain a component (A-2) having a resin solids content of 80%, a primary hydroxyl group equivalent of 518 and an amine value of 54.

(1-3) (A-3):

A reactor was charged with 950 parts of bisphenol A diglycidyl ether having an epoxy equivalent of 190, 330 parts of an epoxy resin XB-4122 (a trade name of a product of Ciba Geigy Ltd.) having an epoxy equivalent of 330, 456 parts of bisphenol A and 21 parts of diethanolamine, the content was heated to 120° C. and reacted until the epoxy value became 1.02 mmole/g, then the reaction product was diluted with 489 parts of ethylene glycol monobutyl ether, cooled, thereafter while the reaction system was maintained at 90° C., 126 parts of diethanolamine, 53.5 parts of monoethanolamine adduct of said N,N-dimethylaminopropylacrylamide and 18.5 parts of N-methylaminoethanol were added thereto, and the resulting mixture was reacted until the viscosity ceased to rise to obtain a component (A-3) having a resin solids content of 80%, a primary hydroxyl group equivalent of 592 and an amine value of 55.

2. Production of Component (B)

(2-1) (B-1):

"EHPE.3150" [trade name of the epoxy resin having an epoxy equivalent of 175 to 195, a product of Daicel Chemical Industries, Ltd.](32.6 parts) and 8.2 parts of propylene glycol monomethyl ether were dissolved under heating at 100° C. to obtain 40.8 parts of a component (B-1) having a solids content of 80% and an epoxy equivalent of 190. Said component had a number average molecular weight of about 1,500.

(2-2) (B-2):

To a mixture of 136 parts of vinylnorbornene oxide, 124 parts of 4-vinylcyclohexene-1-oxide and 18 parts of trimethylolpropane, 200 parts of a 10% ethyl acetate solution of BF₃-etherate was added dropwise at 50° C. over 4 hours to carry out a ring-opening polymerization. The resultant ring-opened polymer was added with ethyl acetate, washed with water, the ethyl acetate layer was concentrated, then 130 parts of ethyl acetate was added anew and dissolved, 160 parts of peracetic acid was made into an ethyl acetate solution and added dropwise at 50° C. over 4 hours, and the resultant mixture was matured for 2 hours to carry out an epoxidation reaction. After removing acetic acid, ethyl acetate and peracetic acid, the remaining epoxidation product was dissolved in 500 parts of ethyl acetate at 40° C., followed by washing with 250 parts of distilled water 4 times, then ethyl acetate was removed, then the matured product was dissolved in 78 parts of propylene glycol monoethyl ether at 80° C. to obtain a component (B-2) having a solids content of 80% and an epoxy equivalent of 202. Said component had a number average molecular weight of about 1,300.

(2-3) (B-3):

To a mixture of 304 parts of partially epoxidated lemonene (2-methyl-4-isopropenyl-1-cyclohexene oxide) and 18 parts of trimethylolpropane, 200 parts of a 10% ethyl acetate solution of BF3-etherate was added dropwise at 50° C. over hours. The treatment thereafter was carried out as in the component (B-2), and the matured product was dissolved in 80 parts of ethylene glycol monobutyl ether at 80° C. to obtain a component (B-3) having a solids content of 80% and an epoxy equivalent of 205. Said component had a number average molecular weight of about 1,000.

(2-4) (B-4):

The process (7) for producing a curing resin (B-2) was repeated except that 304 parts of 2,4 (or) 1,4-dimethyl-4-ethenyl-1-cyclohexene oxide was used to obtain a component (B-4) having a solids content of 80% and an epoxy equivalent of 199. Said component had a number average molecular weight of about 950.

(2-5) (B-5):

To a mixture of 460 parts of "Celoxide 3000"

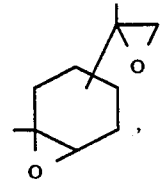

, a trade name of a product of Daicel Chemical Industries, Ltd.), 0.3 part of aluminum acetylacetonate and 5 parts of tetraethoxysilane, 0.1 part of distilled water was added, the mixture was maintained at 80° C. for 1 hour, then reacted at 120° C. for 3 hours, then to the reaction product was added 116 parts of ethylene glycol monobutyl ether to obtain a component (B-5) having a solids content of 80% and an epoxy equivalent of 280. Said component has a number average molecular weight of about 1,100.

(2-6) (B-6)

A cyclopentadiene dimer (132 parts) was dissolved in 70 parts of ethyl acetate, to the resulting solution, 160 parts of peracetic acid as an ethyl acetate solution was added dropwise at 35° C. over 7 hours, and the mixture was further matured at 40° C. for 6 hours. After removal of acetic acid, ethyl acetate and peracetic acid, the matured product was dissolved at 40° C. in 500 parts of ethyl acetate, followed by washing with 250 parts of distilled water 5 times, then ethyl acetate was removed and the matured product was dissolved at 80° C. in 43 parts of methyl isobutyl ketone to obtain a compound (B-6-1) having a solids content of 80% and an epoxy equivalent of 90.

4-Vinylcyclohexene (94 parts) was dissolved in 75 parts of ethyl acetate, to the resulting solution, 160 parts of peracetic acid made into an ethyl acetate solution was added dropwise at 50° C. over 4 hours, and further matured at 50° C. for 2 hours. After removal of acetic acid, ethyl acetate and peracetic acid, the matured product was dissolved in 500 parts of ethyl acetate at 40° C., followed by washing with 250 parts of distilled water 5 times, then ethyl acetate was removed, and the matured product was dissolved at 80° C. in 32 parts of methyl isobutyl ketone to obtain a compound (B-6-2) having a solids content of 80% and an epoxy equivalent of 65.

To a mixture of 225 parts of the compound (B-6-1) and 163 parts of the compound (B-6-2), 0.2 part of aluminum acetylacetonate and 10 parts of trimethylolpropane were added, the resulting mixture was maintained at 100° C. for 1 hour, then reacted at 150° C. for 3 hours, then 60 parts of ethylene glycol monobutyl ether was added to cool the system to thereby obtain a component (B-6) having a solids content of 70% and an epoxy equivalent of 210. Said component had a number average molecular weight of about 1,100.

(2-7) (B-7):

Azobisdimethylvaleronitrile (2 parts) dissolved in 33.4 parts of METHB monomer (3,4-epoxycyclohexylmethyl methacrylate) was added dropwise to a mixed solvent of 10 parts of methyl isobutyl ketone and 10 parts of butyl cellosolve heated at 100° C. over 2 hours, the resulting mixture was matured for 1 hour, then heated to 125° C., at which temperature the matured mixture was further matured for 1 hour to obtian 54 parts of a component (B-7) solution having a solids content of 60% and an epoxy equivalent of 196. Said component had a number average molecular weight of about 10,000.

(2-8) (B-8):

Azobisdimethylvaleronitrile (2.4 parts) dissolved in a mixture of 32.0 parts of an METHB monomer and 8.0 parts of hydroxyethyl acrylate was added dropwise to 24 parts of butyl cellosolve heated at 100° C. over 2 hours, and matured for 1 hour, then the system was heated at 125° C., and again matured for 1 more hour to obtain 64.8 parts of a component (B-8) having a solids content of 60% and an epoxy equivalent of 245. Said component had a number average molecular weight of about 12,000.

(2-9) (B-9):

Azobisdimethylvaleronitrile (2.4 parts) dissolved in a mixture of 37 parts of 3,4-epoxycyclohexylmethyl acrylate and 3 parts of hydroxyethyl acrylate was treated in the same way as in the preceding process for the production of the component (B-8) to obtain a component (B-9) having a solids content of 60% and an epoxy equivalent of 200. Said component had a number average molecular weight of about 15,000.

3. Production of Component (C)

C-(1) to (5):

A 1-liter flask equipped with a stirrer, a thermometer, a condensing pipe and a heating mantle was charged with deionized water in amounts shown in Table-1 and the emulsifiers shown in Table-1 in amounts shown in Table-1, and the contents were heated with stirring to 90° C., to which 20% of aqueous solutions of 12.5 parts of the polymerization initiator shown in Table-1 dissolved in 500 parts of deionized water was added. After 15 minutes since the addition, 5% of the monomeric mixture shown in Table-1 was added. Then, after further stirring for 30 minutes, the remaining monomeric mixtures and the polymerization initiator began to be added dropwise. The monomeric mixtures and the polymerization initiators were added dropwise over 3 hours and 3.5 hours, respectively. During the period, the polymerization temperature was maintained at 90° C. After dropping of the aqueous solutions of the polymerization initiators, heating was continued for 30 minutes to maintain the temperature at 90° C., then the temperature was lowered to room temperature. The resulting polymers were taken out using a filter cloth to obtain finely divided gelled polymers having the solids content of 20%.

The properties of the resulting polymers are shown in Table-2.

TABLE-1

| Component (C) | Amounts of initially charged deionized water (parts) | Emulsifier Kind *1 | Amount *2 used (parts) |
|---|---|---|---|
| (1) | 3507.5 | K-180 | 80(20) |
| (2) | 3507.5 | K-180 | 80(20) |
| (3) | 3507.5 | K-180 | 80(20) |
| (4) | 3517.5 | K-180 | 120(30) |
| (5) | 3562.5 | K-180/H-3355N | 60/15(15/15) |

| Component (C) | Monomer Composition *3 | Amount used (parts) | Kind of polymerization or initiates *4 |
|---|---|---|---|
| (1) | St/nBA/1,6-HDDA | 470/470/60 | VA-086 |
| (2) | St/nBA/1,6-HDDA/HEA/KBM-503 | 430/440/40/40/50 | VA-086 |
| (3) | St/nBA/1,6-HDDA/HEA/KBM-503 | 430/440/40/40/50 | VA-080 |
| (4) | MMA/nBA/1,6-HDDA | 470/470/60 | VA-086 |
| (5) | MMA/nBA/1,6-HDDA | 470/470/60 | VA-086 |

(NOTE) in Table-1
*1 K-180: an allyl group-containing cationic reactive emulsifier of a quarternary ammonium salt type (trade name "Ratemuru K-180" of Kao Corporation, a 25% aqueous solution).
H-3355N; trade name for an allyl group-containing nonionic reactive emulsifier (100% grade) produced by Dai-Ichi Kogyo Seiyaku Co., Ltd. and is commercially available.
*2 Numerals inside the brackets show the amounts used calculated as the solids contents.
*3 St; styrene, n-BA; n-butyl acrylate, 1,6-HDDA; 1,6-hexanediol diacrylate, HEA; 2-hydroxyethyl acrylate, MAAc; methacrylic acid, KBM-503; gamma-methacryloxypropyltrimethoxy silane, produced by Shin-Etsu Chemical Co., Ltd. and is commercially available, MMA; methyl methacrylate.
*4 VA-086; a water-soluble azoamide polymerization initiator: 2,2-azobis[2-methyl-N-(2-hydroxyethyl)-propionamide] produced by Wako Pure Chemicals Industries, Ltd. and is commercially available, VA-080; a water-soluble azoamide polymerization initiator; 2,2-azobis 2-methyl-N-[1,1-bis-(hydroxymethyl)-2-hydroxyethyl]-propinoamide, produced by Wako Pure Chemicals Industries, Ltd.

TABLE-2

| | Properties of finely divided polymer | | |
|---|---|---|---|
| | Particle diameter (nm)*5 | Diameter of particle dispersed in solvent (nm)*6 | Water-resistance *7 |
| Example | | | |
| 1 | 74 | 80 | ⊚ |
| 2 | 71 | 85 | ⊚ |
| 3 | 69 | 80 | ⊚ |
| 4 | 80 | 83 | ⊚ |
| 5 | 87 | 93 | ○ |

(NOTE) in Table 2
*5 It was measured by Nanosizer N-4 manufactured by Coulter Co.
*6 After drying the finely divided polymer at 60° C., it was re-dispersed in acetone, and the diameters of particles dispersed in acetone were measured by Nanosizer N-4 manufactured by Coulter Co.
*7 A polymer film produced on a glass sheet was dipped in water, and the whitened stae of the film was evaluated according to the following standard.
After lapse of 1 hours, not whitened at all: ⊚
After lapse of 1 hours, slightly whitened: ○
Whitened in 10-30 minutes: △
Immediately whitened: x

C-(6):

A 1-liter flask equipped with a stirrer, a thermometer, a condensing pipe and a heating mantle were charged with 3507.5 parts of deionized water and 80 parts of Ratemuru K-180, and the contents were heated to 90° C. with stirring, to which 20% of aqueous solution of 12.5 parts of the polymerization initiator VA-086 dissolved in 500 parts of deionized water was added. After 15 minutes since the addition, 5% of the following monomeric mixture was added.

| | |
|---|---|
| Styrene | 420 parts |
| n-Butyl acrylate | 420 parts |
| 1,6-Hexanediol diacrylate | 40 parts |
| 2-Hydroxyethyl acrylate | 40 parts |
| N,N-Dimethylaminoethyl methacrylate | 30 parts |
| KBM-503 | 50 parts |

Then, after further stirring for 30 minutes, the remaining monomer mixture and the polymerization initiator solution began to be added dropwise. The monomeric mixture and the aqueous polymerization initiator solution were added dropwise over 3 hours and 3.5 hours, respectively. During the period, the polymerization temperature was maintained at 90° C. After dropping of the aqueous solution of the polymerization initiator, heating was continued for 30 minutes to maintain the temperature at 90° C., then the temperature was lowered to room temperature. The resulting polymer was taken out using a filter cloth to obtain finely divided gelled polymer. The properties of the resulting polymer are shown in Table 3.

C-(7):

The procedures of C-(6) above were repeated except that the monomeric mixture was change to the following to obtain a finely divided gelled polymer having properties shown in Table-3.

| | |
|---|---|
| Styrene | 420 parts |
| n-Butyl acrylate | 420 parts |
| 1,6-Hexanediol diacrylate | 40 parts |
| 2-Hydroxyethyl acrylate | 40 parts |
| N,N-Dimethylaminopropyl acrylamide | 30 parts |
| KBM-503 | 50 parts |

C-(8):

The procedures of C-(6) above were repeated except that the polymerization initiator was change to V-080 (a product of Wako Pure Chemicals Industries, Ltd.) to obtain a finely divided gelled polymer having properties shown in Table-3.

TABLE-3

| | C-(6) | C-(7) | C-(8) |
|---|---|---|---|
| Solids content (%) | 20.0 | 20.0 | 20.0 |
| pH | 5.0 | 5.5 | 5.1 |
| Viscosity (cps)*8 | 20 | 40 | 30 |
| Particle diameter (nm)*6 | 82 | 76 | 80 |

(NOTE) in Table-3
*8 BMtype rotary viscometer, No. 2 or No. 3 spindle.

(4) Pigment paste (P-1)

A component (A) (12.5 parts) was added with 4.4 parts of 10% formic acid, to which 15 parts of deionized water was added with stirring, the resulting mixture was further added with 10 parts of titanium white, 10 parts of clay, 1 part of carbon and 2 parts of basic lead silicate. The resulting mixture was dispersed in a ball mill for 24 hours, then added with 11 parts of deionized water to obtain a paste (P-1) having a solids content of 50%. The component (A) used corresponded to the component (A-1), (A-2) or (A-3) to be mixed with the pigment paste.

II. Examples and Comparative Examples

Using the components (A), (B) and (C) and the pigment paste (P-1) obtained in the aforesaid Production Examples, cationically electrodepositable paints, were prepared. At first, the components (A) and (B) were mixed, and after blending the resulting composition with the component (C) and pigment paste (P-1) and the like deionized water was added to the resulting mixture to obtain coating baths for cationic electrodeposition having a solids content of about 20%. The compositions and performances of the coated film are shown in Table-4.

TABLE-4

| | Example | | | | | | | | | | | | Comparative Example | | |
|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 |
| Composition | | | | | | | | | | | | | | | |
| Component (A) Kind | A-1 | A-2 | A-3 | A-1 | A-2 | A-3 | A-1 | A-2 | A-3 | A-1 | A-2 | A-3 | A-1 | A-2 | A-3 |
| Amount | 91 | 91 | 91 | 91 | 91 | 91 | 91 | 91 | 91 | 91 | 91 | 91 | 91 | 91 | 91 |
| Component (B) Kind | B-1 | B-2 | B-3 | B-4 | B-5 | B-6 | B-7 | B-8 | B-9 | B-3 | B-2 | B-1 | B-1 | B-10 | B-10 |
| Amount | 30 | 30 | 30 | 33 | 33 | 33 | 35 | 35 | 35 | 40 | 40 | 40 | 30 | 30 | 30 |
| Component (C) Kind | ① | ② | ③ | ④ | ⑤ | ⑥ | ⑦ | ⑧ | ② | ④ | ⑥ | ⑧ | — | ② | — |
| Amount | 13 | 13 | 13 | 17 | 17 | 17 | 13 | 17 | 17 | 28 | 17 | 13 | — | 13 | — |
| Pigment (P-1) | 30 | 30 | 30 | 30 | 30 | 30 | 30 | 30 | 30 | 30 | 30 | 30 | 30 | 30 | 30 |
| Lead octanoate | 3 | 3 | 3 | 3 | 3 | 3 | 3 | 3 | 3 | 2 | 2 | 1 | 3 | 3 | 3 |
| pH | 5.6 | 5.6 | 5.6 | 5.8 | 5.8 | 5.8 | 6.0 | 6.0 | 6.0 | 6.2 | 6.2 | 6.2 | 5.6 | 5.6 | 5.6 |
| Concentration of solids content (%) | 20 | 20 | 20 | 20 | 20 | 20 | 20 | 20 | 20 | 20 | 20 | 20 | 20 | 20 | 20 |
| Performance | | | | | | | | | | | | | | | |
| Weight loss on heating | 3.5 | 3.7 | 3.8 | 3.6 | 3.4 | 3.7 | 3.5 | 3.6 | 3.7 | 3.5 | 3.4 | 3.8 | 3.6 | 18.1 | 19.5 |
| Melt viscosity of coated film | $10^6$ | $10^6$ | $10^6$ | $10^6$ | $10^6$ | $10^6$ | $10^6$ | $10^6$ | $10^6$ | $10^6$ | $10^6$ | $10^6$ | $10^3$ | $10^4$ | $10^{1.5}$ |
| Smoothness of coated surface | ⊚ | ⊚ | ⊚ | ⊚ | ⊚ | ⊚ | ⊚ | ⊚ | ⊚ | ⊚ | ⊚ | ⊚ | ○ | ⊚ | ○ |
| Impact strength | 50 | 50 | 50 | 50 | 50 | 50 | 50 | 50 | 50 | 50 | 50 | 50 | 50 | 50 | 50 |
| Edge covering property | ○ | ⊙ | ⊙ | ○ | ○ | ⊙ | ⊙ | ⊙ | ⊙ | ○ | ⊙ | ⊙ | △ | △ | X |
| Corrosion resistance | ○ | ○ | ○ | ○ | ○ | ○ | ○ | ○ | ○ | ○ | ○ | ○ | ○ | ○ | ○ |
| Weather | ○ | ○ | ○ | ○ | ○ | ○ | ○ | ○ | ○ | ○ | ○ | ○ | ○ | X | X |

TABLE-4-continued

| | Example | | | | | | | | | | | | Comparative Example | | |
|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 |
| resistance | | | | | | | | | | | | | | | |

In Table-4,
(i) The blending amounts of the components (A), (B) and (C), pigment paste (P-1) and lead octanoate were indicated as solids contents, respectively.
(ii) The pH of the electrodeposition baths was adjusted with aqueous 10% formic acid solution.
(iii) The solids content of the electrodeposition baths was adjusted with deionized water.
(iv) Comparative Example 1:
The procedure of Example 1 were repeated except that the component (C) was removed from the composition used in Example 1.
Comparative Example 2:
The procedure of Example 2 were repeated except that the component (B-2) (30 parts) in Example 2 was replaced by 33 parts of a curing agent obtained by completely blocking diphenylmethane diisocyanate with ethylene glycol 2-ethylhexyl monoetherate, and dioctyltin oxide was added as a catalyst in an amount of 3 parts per 100 parts by weight of the sum of the components (A) and (B).
Comparative Example 3:
The procedure of Comparative Example 2 were repeated except that the component (C) was not blended.

III. Results of Performance Tests

Maintaining the temperature of the cationic electrodeposition baths obtained in the Examples and Comparative Examples at 30° C., steel plates treated with lead phosphate were dipped in the baths at a voltage of 200 to 300 V for 3 minutes to cationically electrodeposit them. After taking out the steel plates thus treated from the baths, and washing with water and air drying them, and the compositions were baked at 160° C. for 30 minutes to crosslink and cure the coated films. The thickness of the cured coating of paint films (flat portions) was 15 to 23 microns.

Using the steel plates thus coated, various tests for examining the performances of the coated films were performed. The results obtained are shown in Table-4.

Methods of testing the performances, the results of which are shown in Table 2, above are as follows.

Weight loss on heating

The weight of the treated plate weights $W_0$, on said plate the sample is electrodeposited at 30° C. for 3 minutes, then the plate is dried under reduced pressure inside a vacuum dryer, after the electrodeposition, at 80° C. for 1 hour, the weight of the dried plate is measured as $W_1$, and the weight after the resin composition is baked at 180° C. for 30 minutes in the dryer is measured as $W_2$. The weight loss on heating W is calculated from the following equation.

$$W = \frac{W_2 - W_0}{W_1 - W_0} \times 100 \, (\%)$$

Melt viscosities of coated films;

The melt viscosity of the electrodeposition-coated film in bakiong at 160° C. is evaluated from a heat flow appearance oc a pencil scratch based on the melt viscosity by a measuring method using a rolling ball (according to JIS-Z-0237). The value is a minimum viscosity (centipoises).

Smoothness of coated surface:

A finishing property of the electrodeposition-coated surface is evaluated by visual observation.
◯ : Good
◉ : Nearly good
△ : Slightly bad Impact resistance:

Measured in an atmosphere of 20° C. according to JIS K-5400-1979 6, 13, 3B. The value is a maximum height (cm) that does not cause a damage of the coated film under such conditions that a dropped weight is 500 g and a diameter of a rear end of an impact center is ½ inch. The maximum value is 50 cm.

Covering property of edge surfaces

Electrodeposition coating is conducted on a steel plate having an edge angle of 45° under such conditions that a thickness of a cured film in a general portion becomes 20 microns, and the coated steel plate is cured under given baking conditions to prepare a test plate. The test plate is put on a salt spray device such that the edge of the test plate is vertical, and then a salt spray test is contined for 168 hours in accordance with JIS-S-2371. Corrosion resistance of the 45° C. edge portion is evaluated as follows:
◉ : Rust does not occur at all.
◯ : Rust slightly occurs.
x : Rust heavily occurs.

Corrosion Resistance:

The electrodepostion-coated films are cross-cut with a knife such that the flaws reach the substrate. Then, the coated films are subjected to salt spray test according to JIS Z2381 for 1,000 hours. Occurrence of corrosion from the cut and widths of the swell of the coated films are measured.
◯ : less that 1 mm
△ : 1—less than 3 mm
x : more than 3 mm Weather Resistance:

Electrodeposition-coated test plates are charged in a sunshine weatherometer Gloss retention ratio after 1,000 hours are measured and evaluated according to the following equation.

$$\text{Gloss retention ratio} = \frac{60° \text{ C. Gloss Value After Test*}}{\text{Initial } 60° \text{ C. Gloss Value}} \times 100$$

*60° Gloss is measured using a gloss meter (GM26D type, produced by Murakami Shikisai Kenkyusho).

Gloss Retention Ratio
◯ no lower than 80%
△ 50 to 89%
X no higher than 49%

What we claimed is:

1. A resin composition for a cationically electrodepositable paint comprising
   (A) a resin having hydroxyl groups and cationic groups and being obtained by reacting a polyepoxide compound obtained from a polyphenol compound and epichlorohydrin with a cationizing agent,
   (B) an epoxy resin having at least 2 epoxy functional groups each of which comprises an epoxy group directly bound to an alicyclic ring and/or bridged alicyclic ring on average per molecule, and (C) a finely divided gelled polymer as principal components, wherein said finely divided gelled polymer is one obtained by emulsion polymerizing (C-1) a polymerizable monomer containing at least two radically polymerizable unsaturated groups, and (C-2) a radically polymerizable unsaturated monomer other than the one mentioned in (C-1) above in the presence of a reactive emulsifier containing one allyl group.

2. The resin composition of claim 1, wherein said resin (A) has a primary hydroxyl equivalent within the range of 200 to 1,000.

3. The resin composition of claim 1, wherein said resin (A) has an amine value within the range of 3 to 200 calculated as KOH (mg/g solids).

4. The resin composition of claim 1, wherein said epoxy resin (B) has at least 3 epoxy functional groups on average per molecule.

5. The resin composition of claim 1, wherein said epoxy functional group of said epoxy resin (B) has a structure selected from the group consisting of the following general formulae (I) to (IV)

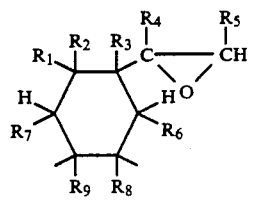  (I)

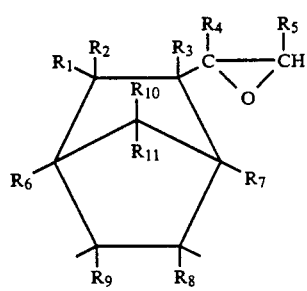  (II)

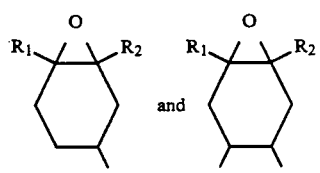  (III)

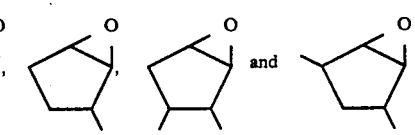  (IV)

wherein
$R_1$, $R_2$, $R_3$, $R_5$, $R_6$, $R_7$, $R_{10}$ and $R_{11}$ represent H, $CH_3$ or $C_2H_5$, respectively, and $R_4$, $R_8$ and $R_9$ represent H or $CH_3$, respectively.

6. The resin composition of claim 1, wherein said epoxy resin (B) has an epoxy functional group represented by the following formula (V)

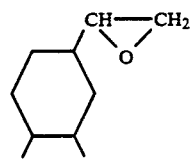  (V)

7. The resin composition of claim 1, wherein said epoxy resin (B) has an epoxy functional group represented by the following formula

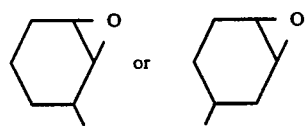

8. The resin composition of claim 1, wherein said epoxy resin (B) has an epoxy equivalent within the range of 100 to 2,000.

9. The resin composition of claim 8, wherein said epoxy resin (B) has an epoxy equivalent within the range of 150 to 500.

10. The resin composition of claim 1, wherein said epoxy resin (B) has a number average molecular weight within the range of 400 to 100,000.

11. The resin composition of claim 1, wherein said epoxy resin (B) has a number average molecular weight within the range of 700 to 50,000.

12. The resin composition of claim 1, wherein the weight ratio of the solids content of said epoxy resin (B) to said resin (A) is within the range of 0.2 to 1.0.

13. The resin composition of claim 1 which further contains at least one metal compound selected from the group consisting of a lead compound, a zirconium compound, a cobalt compound, an aluminum compound, a manganese compound, a copper compound, a zinc compound, an iron compound, a chromium compound and a nickel compound which is contained in such an amount that the metal content based on the total weight of the resin (A) and the epoxy resin (B) is not more than 10% by weight.

14. The resin composition of claim 1, wherein said finely divided gelled polymer (C) is obtained by emulsion polymerizing (C-1) a polymerizable monomer containing at least two radicaly polymerizable unsaturated groups, (C-2) a radically polymerizable unsaturated monomer mixture consisting of (C-2-(I)) a polymerizable unsaturated vinyl silane monomer containing a vinylic double bond and a hydrolyzable alkoxy silane group, (C-2-(II)) a polymerizable unsaturated monomer containing a vinylic double bond and a hydroxyl group, and (C-2-(III)) a other polymerizable unsaturated monomer other than said polymerizable unsaturated monomers (C-2-(I)) and (C-2-(II))

in the presence of a cationic reactive emulsifier containing an allyl group.

15. The resin composition of claim 1, wherein said finely divided gelled polymer (C) is obtained by emulsion polymerizing (C-1) a polymerizable monomer containing at least two radically polymerizable unsaturated groups, (C-2) a radically polymerizable unsaturated monomer mixture consisting of
  (C-2-(I)) a polymerizable unsaturated vinyl silane monomer containing a vinylic double bond and a hydrolyzable alkoxy silane group,
  (C-2-(II)) a polymerizable unsaturated monomer containing a vinylic double bond and a hydroxyl group, and
  (C-2(III)) a polymerizable unsaturated monomer other than said polymerizable unsaturated monomers (C-2-(I)) and (C-2-(II))
in the presence of a cationic reactive emulsifier containing an allyl group using a water-soluble azoamide compound as a polymerization initiator.

16. The resin composition of claim 1, wherein said finely divided gelled polymer (C) is obtained by emulsion polymerizing
  (C-1) a polymerizable monomer containing at least two radically polymerizable unsaturated groups,
  (C-2) a radically polymerizable unsaturated monomer mixture consisting of
    (C-2-(I)) a polymerizable unsaturated vinyl silane monomer containing a vinylic double bond and a hydrolyzable alkoxy silane group,
    (C-2-(II)) a polymerizable unsaturated monomer containing a vinylic double bond and a hydroxyl group, and
    (C-2-(III)) an unsaturated monomer containing an amino group, and
    (C-2-(IV)) a polymerizable unsaturated monomer other than said polymerizable unsaturated monomers (C-2-(I)), (C-2-(II)) and (C-2-(III))
in the presence of a cationic reactive emulsifier containing an allyl group.

17. The resin composition of claim 1, wherein said finely divided gelled polymer (C) is obtained by emulsion polymerizing
  (C-1) a polymerizable monomer containing at least two radically polymerizable unsaturated groups,
  (C-2) a radically polymerizable unsaturated monomer mixture consisting of
    (C-2-(I)) a polymerizable unsaturated vinyl silane monomer containing a vinylic double bond and a hydrolyzable alkoxy silane group,
    (C-2-(II)) a polymerizable unsaturated monomer containing a vinylic double bond and a hydroxyl group,
    (C-2-(III)) an unsaturated monomer containing an amino group, and
    (C-2-(IV)) a polymerizable unsaturated monomer other than said polymerizable unsaturated monomers (C-2-(I)), (C-2-(II)) and (C-2-(III))
in the presence of a cationic reactive emulsifier containing an allyl group using a water-soluble azoamide compound as a polymerization initiator.

18. The resin composition of claim 1, wherein said finely divided gelled polymer (C) is contained in an amount of 5 to 30% by weight based on the sum of said resin (A) and said epoxy resin (B) calculated as solids content.

19. A cationically electrodepositable paint containing the resin composition of claim 1.

20. A product coated with cationically electrodepositable paint of claim 19.

21. The resin composition of claim 1 wherein the gelled polymer is one which is internally crosslinked and has incorporated therein a surface-activating group by means of a chemical bond on the surface of the particles of the gelled polymer.

* * * * *